United States Patent [19]

Hill

[11] Patent Number: 5,616,977
[45] Date of Patent: Apr. 1, 1997

[54] POLYPHASE ELECTRIC MACHINES WITH PREFABRICATED WINDING LAYERS

[76] Inventor: Wolfgang Hill, Ortenbergstr. 3 76135, Karlsruhe, Germany

[21] Appl. No.: 190,026

[22] PCT Filed: Jul. 29, 1992

[86] PCT No.: PCT/DE92/00617

§ 371 Date: Jun. 27, 1994

§ 102(e) Date: Jun. 27, 1994

[87] PCT Pub. No.: WO93/03534

PCT Pub. Date: Feb. 18, 1993

[30] Foreign Application Priority Data

Jul. 29, 1991 [DE] Germany ............................ 41 25 044.3

[51] Int. Cl.$^6$ ..................................................... H02K 1/00
[52] U.S. Cl. .................... 310/179; 310/180; 310/181; 310/260; 310/270; 310/206; 310/207; 29/598; 29/596
[58] Field of Search ..................................... 310/179, 180, 310/181, 260, 270, 206, 207

[56] References Cited

U.S. PATENT DOCUMENTS

| | | | |
|---|---|---|---|
| 2,469,808 | 5/1949 | Aske | 310/268 |
| 2,683,232 | 7/1954 | Weissheimer | 310/268 |
| 3,719,844 | 3/1973 | Easton | 310/184 |
| 4,319,152 | 3/1982 | van Gils | 310/201 |
| 4,398,112 | 8/1983 | van Gils | 310/201 |
| 4,543,503 | 9/1985 | Kaminski et al. | 310/59 |
| 5,093,598 | 3/1992 | Fort | 310/215 |
| 5,252,880 | 10/1993 | Kazmierczak et al. | 310/270 |
| 5,332,939 | 7/1994 | Fanning et al. | 310/71 |
| 5,422,526 | 6/1995 | Kawabata et al. | 310/201 |

FOREIGN PATENT DOCUMENTS

| | | |
|---|---|---|
| 0414927 | 3/1991 | European Pat. Off. . |
| 1405924 | 6/1965 | France . |
| 558486 | 9/1932 | Germany . |
| 1123758 | 2/1962 | Germany . |
| 1963868 | 7/1970 | Germany . |
| 2835386 | 2/1980 | Germany . |
| 662990 | 11/1987 | Switzerland . |

Primary Examiner—Thomas M. Dougherty
Assistant Examiner—Elvin G. Enad
Attorney, Agent, or Firm—Buchanan Ingersoll, P.C.

[57] ABSTRACT

Known flat winding layers that can be prefabricated and inserted into soft magnetic bodies insufficiently utilize the available space in the grooves and winding overhang of polyphase machines and thus increase the volume and weight of the machine. A new winding design allows high power and force densities to be obtained, thanks to the utilization of the whole available space, and are economic to produce. For that purpose each winding layer (4d) is composed of several conductor lanes (22–24) whose number corresponds to the number of phases. The height of the conductor lanes is reduced at the points (25–33) where they intersect, due to the fact that the conductors are mutually offset, and thus pass over each other inside the layer. By variably adapting the width of the conductor the space in the winding overhang through which the magnetic flow is directed in the soft magnetic body is utilized. The space available in the winding overhangs is completely utilized thanks to double winding layers of which each second layer mirrors the first and is offset by a pole pitch with respect to the first. The winding is suitable for motors and generators whose volume and weight can be advantageously reduced.

15 Claims, 8 Drawing Sheets a)

b)

c)

d)

e)

POLYPHASE ELECTRIC MACHINES WITH PREFABRICATED WINDING LAYERS

TECHNICAL FIELD

The invention concerns a polyphase electric machine with a plane air gap and a soft magnetic body.(37a, 37b, 39a, 39b)

BACKGROUND OF THE INVENTION

In a polyphase rotary field winding for an electric machine in which the conductor lanes are arranged in an offset pattern, hollow spaces usually occur in the winding overhangs, because the conductor lanes of the different phases intersect in the projection from the air gap at least once for each pole pitch. This causes the space in the grooves and winding overhangs to be poorly utilized and the length of the conductor to be increased. If for a high degree of effectiveness a predetermined low conductor resistance is to be maintained, the increase of resistance based on the increased length of the conductor must be compensated by an enlargement of the cross section of the conductor which further increases the volume and weight of the machine.

U.S. Pat. No. 4,398,112 describes a layered conductor for disk armatures and linear motors in which a conductor lane which is stamped from sheet metal represents a winding layer which is inserted into the grooves from the plane of the groove openings in the direction of the groove depth. By inserting identical winding layers of constant conductor height, the conductor lanes can be cost-effectively punched from sheet metal. The winding known from US-PS though shows very short lengths for all conductor lanes; however, since all conductor lanes must have a different distance from the plane of the groove openings, space utilization in the grooves of a 2-phase machine decreases to 50%, in a 3-phase machine to 33.3%, etc. Though the required conductor volume remains low in the known US-PS, the iron volume of the wielding design through which the magnetic flow is passing increases, and with the larger dimensions of the machine, the volume and weight of the housing increases as well.

With the number of phases, however, increases that portion of the machine which actively contributes to the generation of torque. For machines which are to combine a high degree of effectiveness with high force and power densities, good space utilization at a higher number of phases besides a high number of pole pairs and short conductor lengths is necessary. The share of the housing, of the magnetic yokes, as well as the exciting winding or, resp. the short circuit cage, or in permanently excited machines the magnets as part of the total volume of the electric machine decrease with increasing groove depth. A highly efficient electric machine should therefore possess deep grooves for high power and force densities.

The invention is, therefore, based on the objective to advance the development of a polyphase electric machine in which the armature and the stator lie in a plane opposite to each other which has at least one slotted soft magnetic body to receive prefabricated winding layers in such a manner that, even with multiple phases, good utilization of available space is achieved in the grooves and winding overhangs, and where the lengths of the conductor lanes can be kept short regardless of the depth of the grooves.

SUMMARY OF THE INVENTION

In accordance with the invention, the complete utilization of space in the grooves of polyphase machines with offset conductor lanes, but particularly in disk armatures and linear motors, is achieved by decreasing the cross section of the conductor lanes in the direction to the groove depth in those sections in which they intersect in their projection from the plane of the groove openings. This allows arrangement of offset conductor lanes belonging to different phases in a layer parallel to the plane of the groove openings. A high utilization of space in the winding overhangs is achieved by widening the cross section of the conductor lanes outside of the soft magnetic body.

These changes in the cross section of the conductor keep the length of the conductors short and enlarge the conductor cross sections in the winding overhangs, thereby resulting—via ohmic losses—either in high efficiency or low weight of the machine. In detail, the complete winding consists of a set of identical winding layers which are stacked in direction to the groove depth. Each winding layer consists of prefabricated conductor lanes of differing phases.

For descriptive purposes, the conductor lanes are separated into sections in which the sections located inside the soft magnetic body are designated as "bars", the sections located in the winding overhang and which run in the direction of the groove length are designated as "bar connecting sections", and the sections also located in the winding overhang but which run in the direction of the groove width are designated as "links". One conductor lane or the serial connection of several conductor lanes of the same phase represent a circuit of the electric machine.

In a favorable embodiment the height of a conductor lane is on the average reduced at or shortly after each second passage of the conductor lane from the soft magnetic body into a winding overhang to about one half of its height in the grooves. In the resulting space are arranged links of conductor lanes from the same winding layer which, however, belong to a different phase. The links of conductor lanes of a winding layer are sequentially arranged in the winding overhangs in direction to the groove length.

The decrease in height of the conductor is largely compensated by the widening of its cross section—by the width of one tooth face—in direction to the groove width. Sections of the conductor lane that do not intersect in the winding overhang with other conductor lanes of the same layer can occupy the full height of the layer and, therefore, have about twice the cross section compared to the sections in the grooves. In addition to the 100% utilization of space in the grooves, the space in the winding overhangs can also be utilized at almost 100% for current conduction, if two winding layers lying on top of each other are set off by one pole pitch and if the cross sections of the conductors in the links are adjusted in accordance with the available space in direction to the groove depth.

In accordance with the invention, the conductor lanes of different phases are arranged at equal distances to the gap surface plane, the number of these conductor lanes which together form an self-supporting winding layer corresponding to the number of phases of the machine. The problem of intersection in the winding overhangs is solved by the variation in the cross sections in which the height of the intersecting conductor lanes of a layer is reduced in such a manner that the sum of the height of the conductors correspond to the height of the conductor in the remaining sections of the conductor lane, resp. the layer. The winding layer, therefore, is of constant height across its total surface lying parallel to the gap surface plane, and in stacking several layers to form a larger winding, empty spaces do not ensue.

The connecting paths in the winding overhangs are kept very short by arranging the links as closely to the soft magnetic body as possible and making them independent of the groove depth. For high drive voltage and power the number of serially switched conductor lanes, resp. the number of the winding layers can be increased arbitrarily depending on the groove depth, with the length of the individual conductor lanes remaining constant. Since in favorable embodiments all conductor lanes of a phase are identical, manufacturing expense can be kept low.

The width of the conductor lanes increases immediately by the width of the tooth face at each passage from the soft magnetic body into the winding overhang, causing the conductor lanes of adjoining grooves in the direction to the groove width to abut against each other—separated only by a thin insulating layer. By this the space in the winding overhang which is located in front of the tooth of the soft magnetic body is utilized for current conduction and the conductor cross section in the bar connection sections is enlarged, resp. the decrease in the height of the conductor is compensated.

The conductor lanes in the winding overhangs show short length, because they are immediately lead away by the corresponding bar, resp. bar connection section, in direction to the groove width. Only conductor lanes of differing phases which show also in the grooves the same distance to the gap surface plane and, therefore, form together a winding layer, influence each other in the distribution of space in the winding overhang. While the length of the conductor and the manufacturing expenses are nearly independent from the depth of the groove, the losses and expenses connected with the volume of the yoke and magnet are decreasing with increasing groove depth.

If the sum of the lengths of the two bar connection sections which each adjoin a corresponding bar is equal in all conductor lanes, then the one-piece conductor lanes can be assembled one after another into a winding layer. By this the production of the complete winding is significantly simplified, because the conductor lanes, independent from the remaining assembly, can be shaped into their final form, insulated, and tested. This embodiment is referred to in the description as winding with asymmetrical winding overhangs.

The embodiment in which the distances of the links from the soft magnetic body in the two winding overhangs are equal for each conductor lane, is referred to in the description as winding with symmetrical winding overhangs. It also distinguishes itself in that one-piece conductor lanes in their prefabricated form can be joined together into one winding layer and, if an adhesive was not applied, the compact winding layer can at any time be disassembled again into its individual conductor lanes. By manufacturing the conductor lanes as single pieces it can be ensured that the conductor lane has the lowest internal resistance in relation to its cross sections and lengths. This is a prerequisite for obtaining favorable efficiency and high power and force densities.

If of two identical winding layers which are placed on top of each other the upper is mirrored on the gap surface plane and subsequently shifted by exactly one pole pitch in the direction to the groove width and joined to the lower layer, and if the height of the links is adapted to the new available space as well, an embodiment is obtained which is hereafter referred to as double winding layer. In a double winding layer, at any point on the circumference, a link shares the double layer height at most with two bar connection sections. The cross sections of all bar connection sections can now be designed with equal dimensions. This prevents the occurrence of local differences in the generation of waste heat on the circumference of the winding overhangs. This design, by complete utilization of the available space in the winding overhangs results in low resistance which either increases machine efficiency or, via decreased cross sections of the conductors, leads to a lower weight. The avoidance of hollow spaces in the winding layers, between the winding layers, and between the winding overhang surfaces and the cooling body improves passive heat dissipation.

The structural design as disk armature as well as linear motor represents a wide area of application of the invention. On the basis of the achievable high force density, a permanently excited disk armature is particularly suited as direct drive for installation into the wheel rim of a vehicle. In this case, the rotor can be connected with the wheel rim base while allowing for axial displacement which would avoid the demand on the rotor for bending caused by, e.g., axial forces which occur by driving through curves. The cooling body located adjacent to the winding overhangs and yokes can be designed as supporting elements of the rim, and the rotor disk as component of a brake. The danger of breakage of the powerful magnets is thereby significantly decreased and the entire wheel rim construction is less rigid and lighter.

If passive cooling is insufficient, winding layers can be replaced in accordance with a special embodiment by flat radiator sections through which a coolant is circulating, without resulting in an increase of the yoke, magnet, and conductor volume.

The drawings show execution examples of the invention.

FIG. 3b shows a cut through the lower hale of the winding layer of FIG. 3a;

Figure 1:
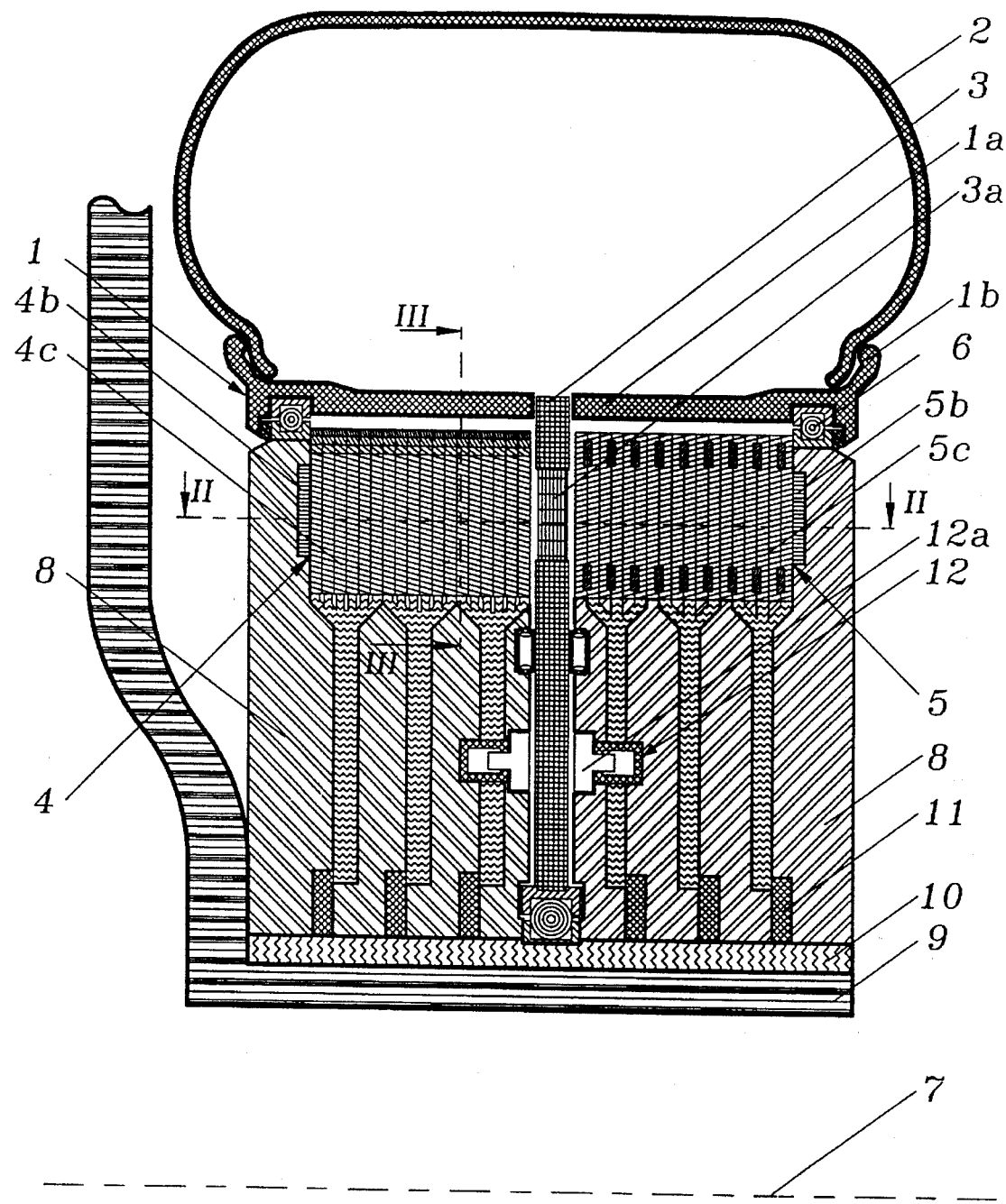
FIG. 1 shows an electric machine in accordance with the invention which is built as disk armature into a wheel rim.

FIG. 1 shows the construction of a disk armature with prefabricated winding layers built into a wheel rim. The wheel rim is labeled 1, the head of the rim 1a, and the tire 2. The disk armature itself consists of the rotor disk 3 into which are inserted the permanent magnets 3a and the two halves of the stator 4 and 5. The stator halves 4 and 5 are supported in relation to the rim 1, respectively the rim base 1b by the bearing 6, and consist each of a soft magnetic body of which only the yoke 4b, 5b is visible in FIG. 1 and the windings 4c, resp. 5c which are shown here in different designs in order to illustrate the invention. To the left of the rotor disk 3 is shown a winding 4c with asymmetric winding overhangs and to the right is shown a winding 5c with double winding layers and symmetric winding overhangs.

The rotor disk 3 is connected to the rim base 1b by a pinion in such a manner that the rim 1 is able to move under axial load in order to avoid stress on bending. Here, for example, the rim base may be designed as cage with axially placed slots into which the teeth of the rotor disk are engaging. The axial width of the teeth is less than that of the slots.

The yokes 4b, 5b of the soft magnetic body, as well as the windings 4c and 5c are embedded in the cooling body 8 which essentially functions as support of the rim base 1b and which is connected with the hub 9. For purposes of weight reduction, the hub is designed as a hollow shaft, and it would be possible to install the power electronics into that space up to the rotational axle 7. Within the cooling body are located the conductors for current supply to the individual winding layers by which current is delivered to the winding layers via commutation equipment consisting of a current distributor board 19 and power transistors 11. A disk brake assembly 12 can be installed into the cooling body itself with the brake shoes 12a of the disk brake assembly acting on the rotor disk 3.

Figure 2:
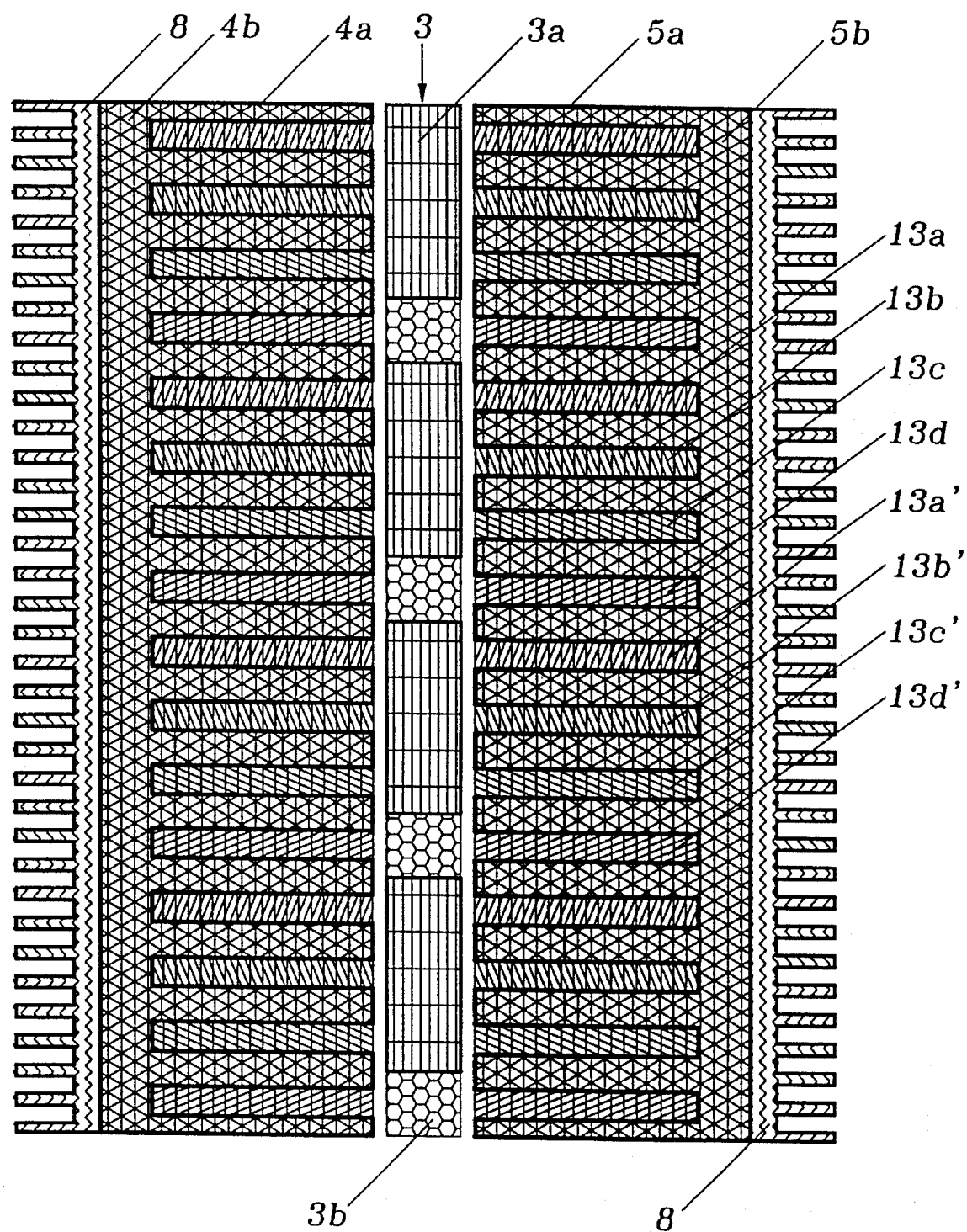
FIG. 2 shows a cut at the line II—II of FIG. 1.

FIG. 2 shows a cut at the line II—II of FIG. 1. An armature with four grooves per pole pitch is shown. The bars constituting a winding layer are labeled 13a–13d, and accordingly, the bars of the adjacent pole pitch 13a'–13d'. In the illustration according to FIG. 2 it can be recognized that the rotor shows pole gaps 3b between the magnet segments 3a.

Figure 3A:
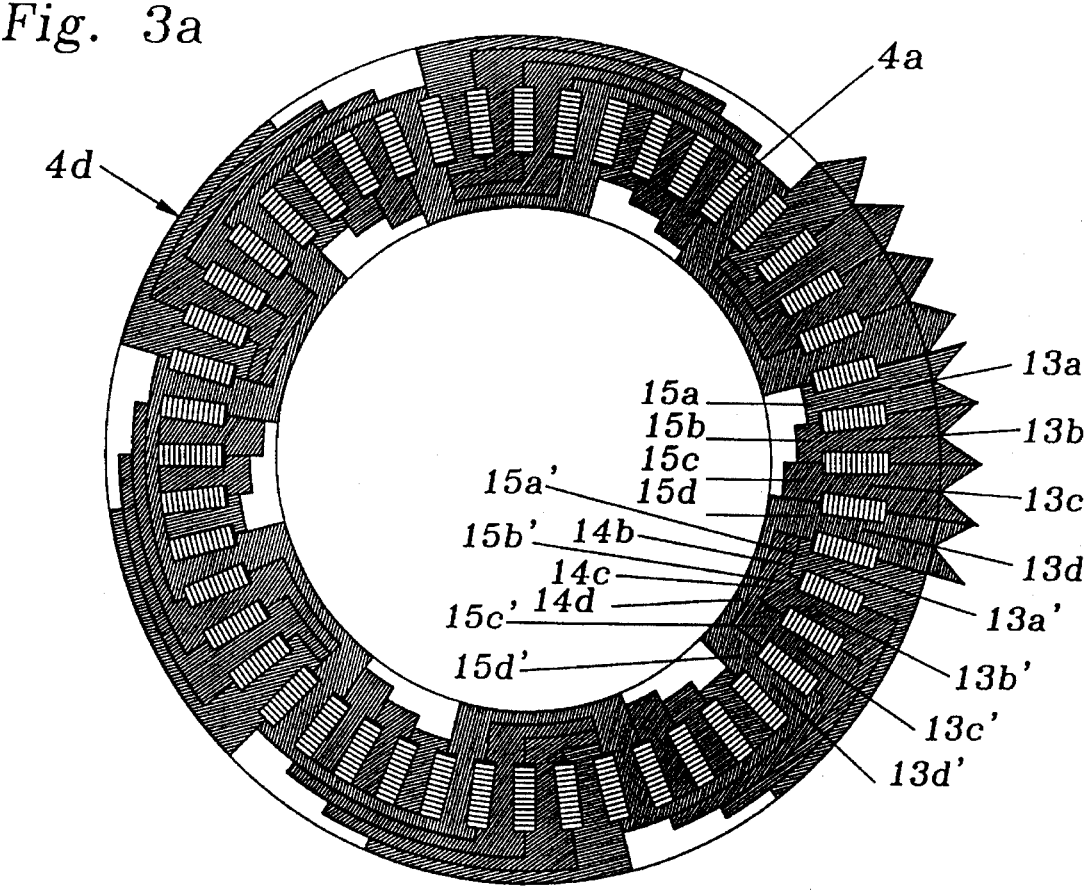
FIG. 3a shows a cut at the line III—III of FIG. 1 through the upper half of a complete winding layer for a 12-pole, 4-phase winding with asymmetric winding overhangs.

FIG. 3a shows a view in accordance with line III—III of FIG. 1. Here also the design is a 4-phase winding with asymmetrical winding overhang. The bars inserted into the grooves are again labeled 13a–13d and they are connected with the bars 13a'–13d' by bar connection sections 15a–15d, respectively 15a'–15d', as well as links 14a–14d; link 14a not being visible since it lies behind the bar connection sections 15b–15d. Such a unit as shown in FIG. 3a in a top view onto the upper half of the layer constitutes a winding layer 4d and a complete winding is achieved by axial stacking of several of these winding layers.

Figure 3B:
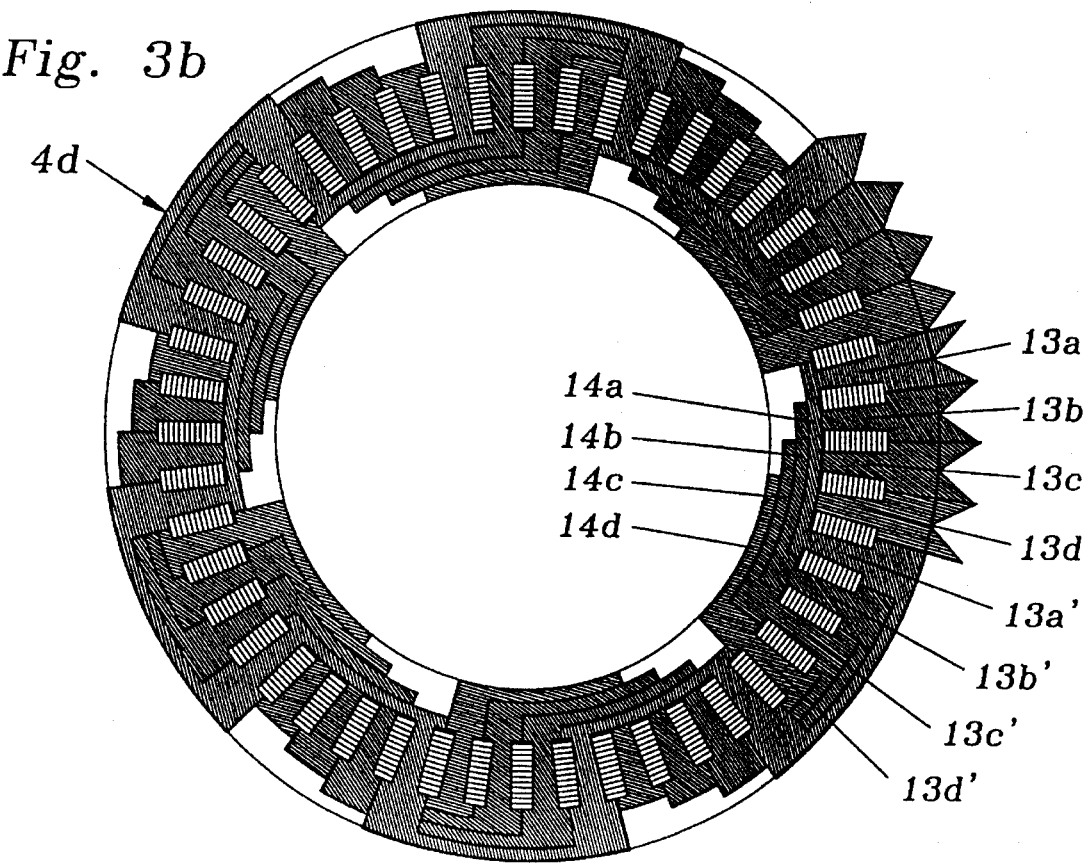

FIG. 3b shows the same winding layer 4d as FIG. 3a, however, it depicts a cut through the lower half of the layer. Here, link 14a is visible, but, therefore, not the bar connection sections 15b–15d. The hatching of the lower half of the layer is rotated by 90° compared to the hatching of the upper half of the layer.

Figure 4A:
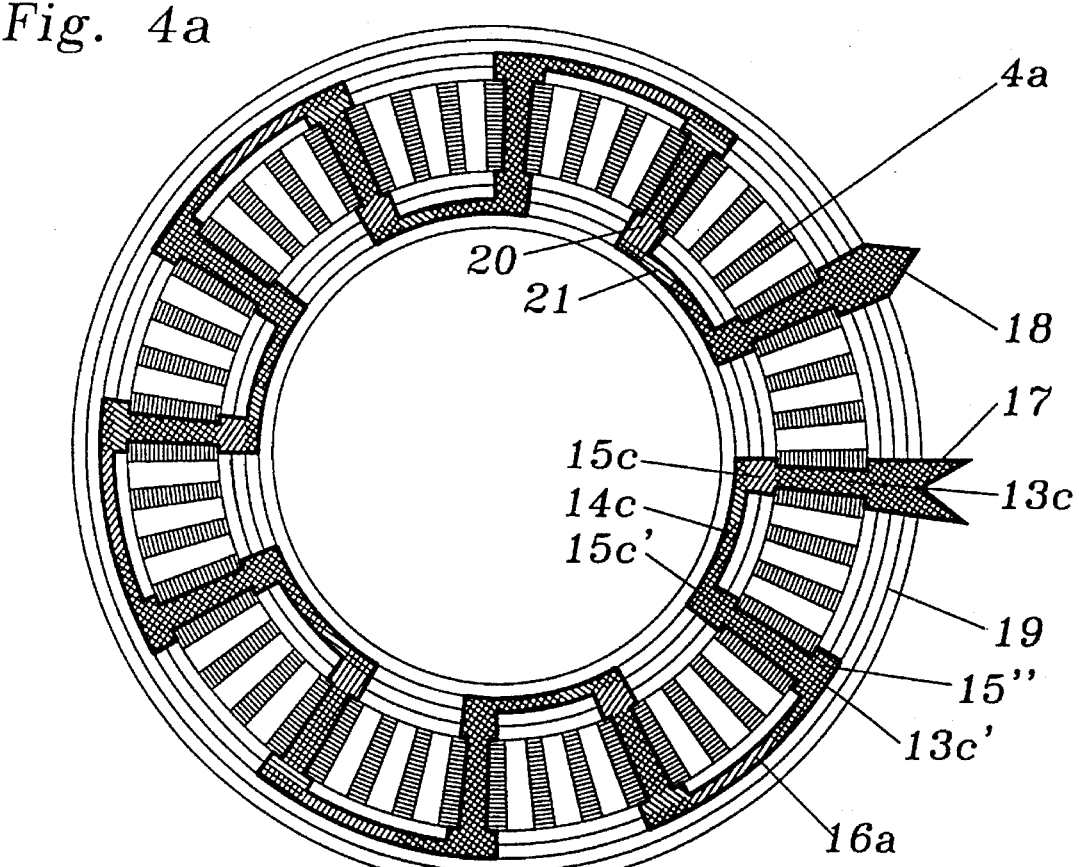
FIG. 4a shows a conductor lane of FIG. 3.

FIG. 4a shows a conductor lane of the winding layer from FIG. 3, depicting a winding with asymmetrical winding overhangs in a 4-phase disk armature with three pole pairs. The teeth of the soft magnetic body 4a are symbolized by concentric hatching, while the two winding overhangs each are indicated by four concentric lines 19, outlining the limits of the four link areas.

The conductor lane is marked by two hatching patterns, in which the hatching from bottom left to top right designates the upper half 20 of the layer and the hatching from bottom right to top left designates the lower half 21 of the layer. Therefore, it can be seen from the type of hatching in which areas of the conductor lane the full height of the layer is achieved and in which areas the lower or upper half of the layers have recesses.

One conductor lane encompasses in the illustrated embodiment the entire circumference of the machine, minus one pole pitch. This opening is used either for current supply 17 and derivation 18 to the drive or, if in the machine several layers are connected in series, it is used for the transition to an adjacent conductor lane in direction to the groove depth. The winding overhang space between the current supply 17 and derivation 18 connections is utilized for supply and derivation connections to other conductor lanes.

The principle of variable conductor cross sections in the winding overhangs allows, of course, the realization of alternative conductor lane configurations in which the arrangement of intersections, resp. narrow sections differ from the embodiment thus far presented.

Figure 4B:
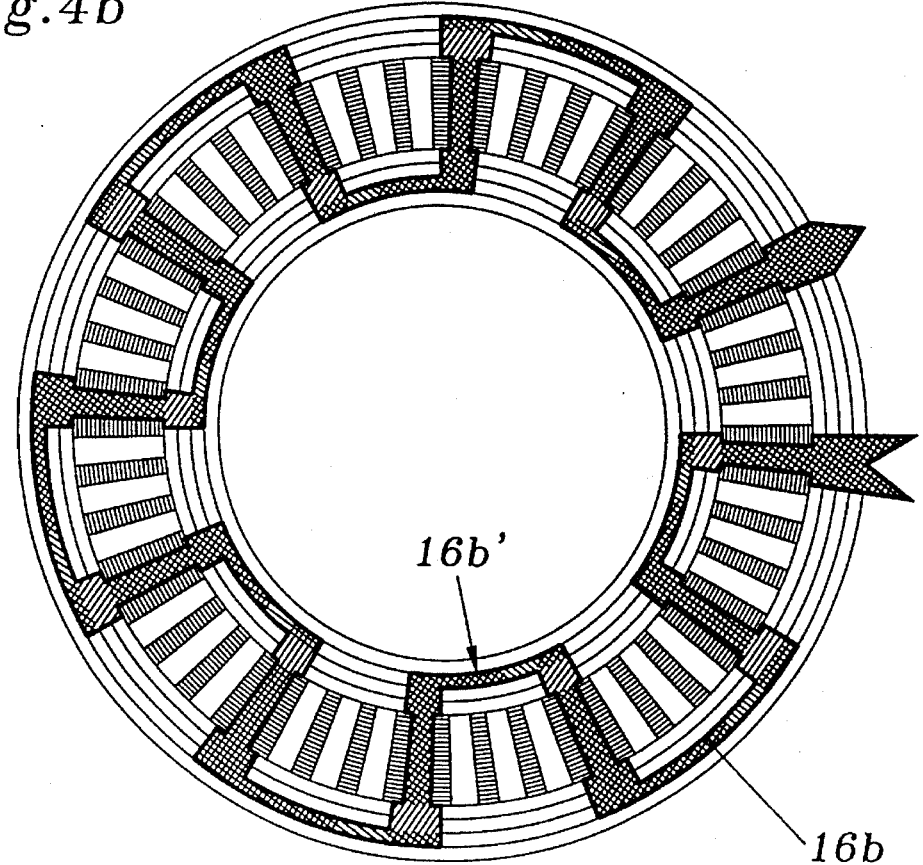
FIG. 4b shows a conductor lane of a 12-pole, 4-phase winding with symmetrical winding overhangs.

As example of a variation, FIG. 4b shows a conductor lane of a winding layer from a winding with symmetrical winding overhangs in a 4-phase disk armature with three pole pairs. Link 16b in the outer winding overhang shows, in contrast to link 16a of FIG. 4a, the same distance to the soft magnetic body as the links in the inner winding overhang 16b', resp. 14c. The hatching has the same meaning as in FIG. 4a.

Figure 5:
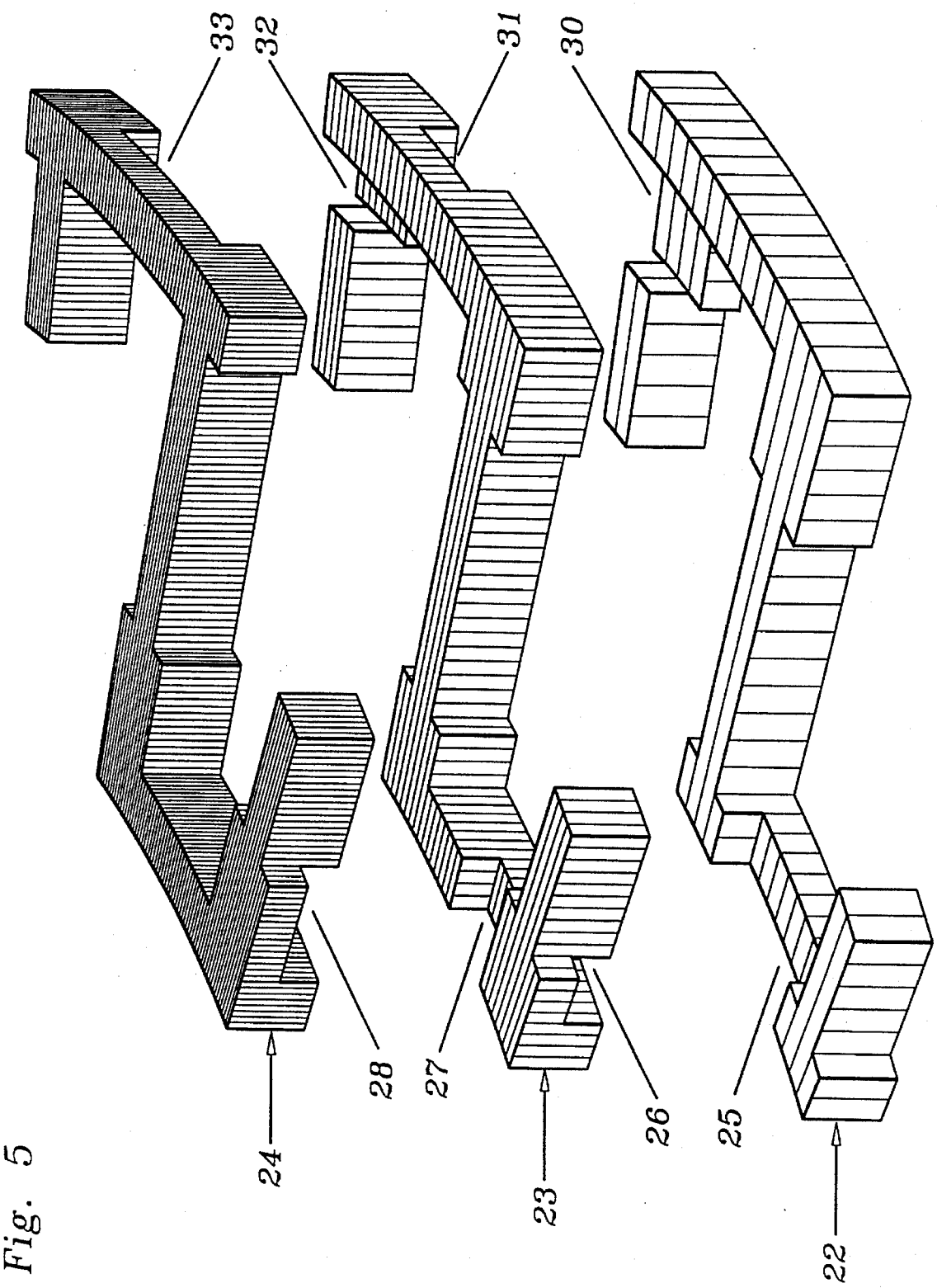
FIG. 5 shows a cutout during assembly of the three conductor lanes of a 3-phase winding layer with asymmetric winding overhangs.

FIG. 5 shows details of the three conductor lanes from a 3-phase winding layer with asymmetrical winding overhangs. Only that part of each conductor lane representing two pole pitches is depicted, beginning fictitiously in the middle of their groove in the first pole pitch and ending in the middle of the groove of the third pole pitch. The partial pieces depicted as single units belong to conductor lanes from a circular winding layer for a disk armature and, therefore, show bent links of differing lengths. The lower conductor lane 22 shows on the left side, in the area of the links 25, recesses in the upper half of the layer and on the right side, in the area of the extended bar connection sections 30, recesses in the upper half of the layer as well. When the middle conductor lane 23 is placed into conductor lane 22, the recesses in the links 25, respectively. 31, and the bar connection sections 26, resp. 30, complement each other such that both lanes can lie in one plane. The recesses in conductor lanes 22 and 23 further allow the insertion of conductor lane 24 in which case the bar connection section 28 due to its reduced height fits into the recesses of the links 25 and 27, and link 33, with its cross section also reduced, runs across the bar connection sections 30 and 32.

Figure 6:
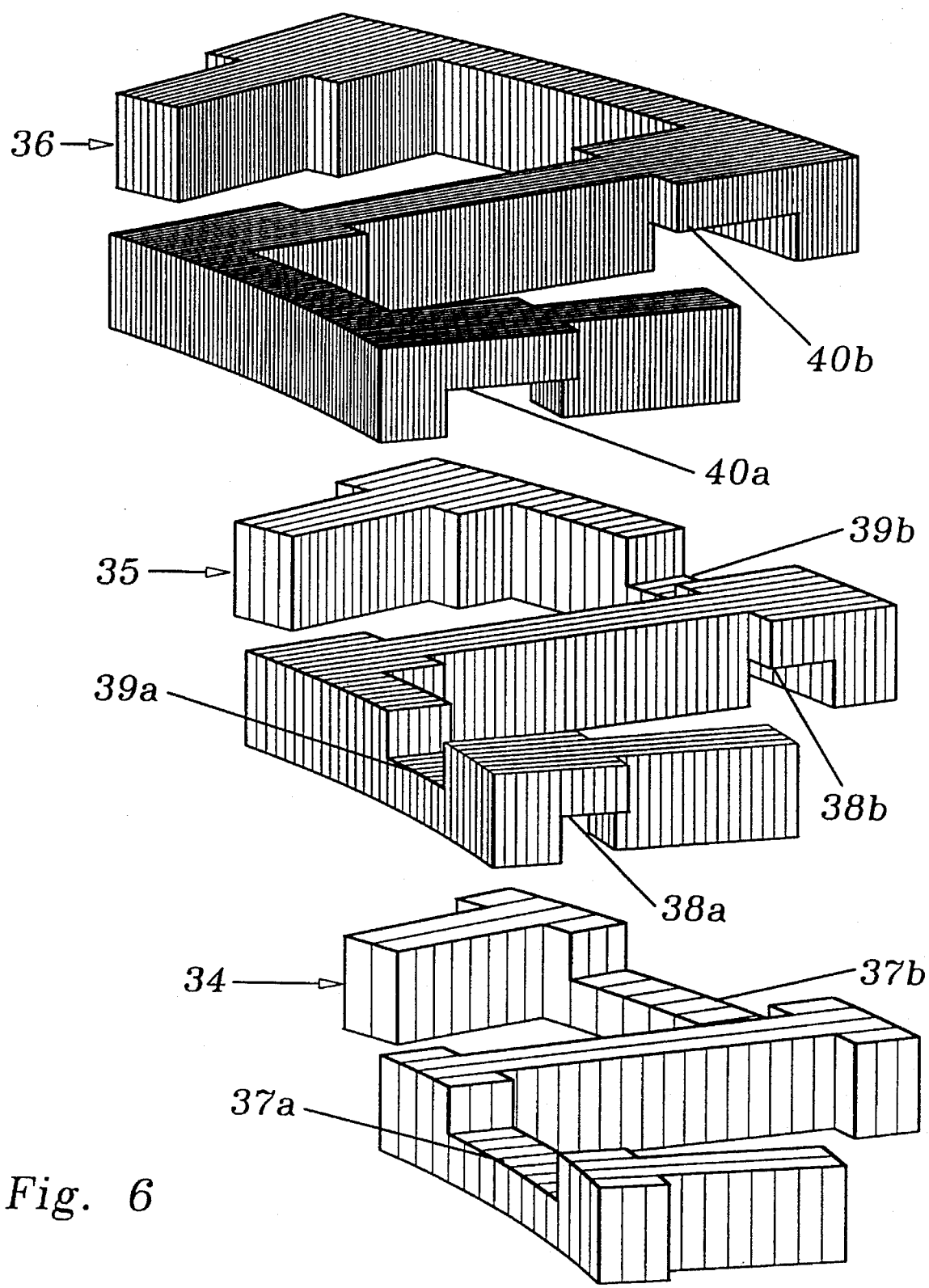
FIG. 6 shows a cutout during assembly of the three conductor lanes of a 3-phase winding layer with symmetric winding overhangs.

The conductor lanes in FIG. 6 show in both winding overhangs similarly configured bar connection sections and links. Again, the conductor lanes can simply be slid together in direction of the groove depth by placing the bar connection sections 38a, 38b of conductor lane 35 which have been reduced in their height into the recesses of links 37a, 37b of conductor lane 34. The recesses of the bar connection sections 40a, respectively. 40b, of conductor lane 36 fit exactly into the space which is formed by the recesses in links 37a and 39a, resp. 37b and 39b.

Figure 7:
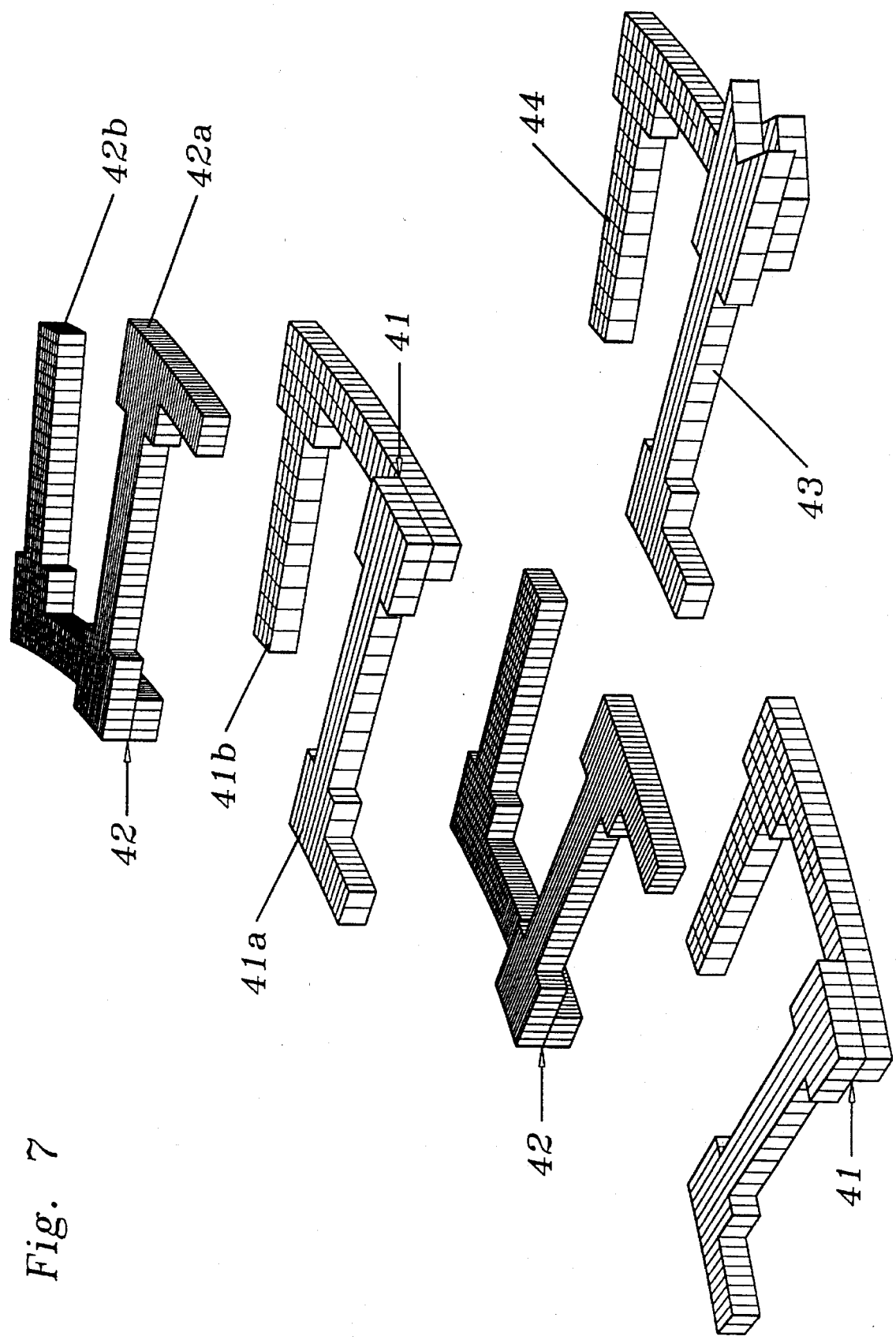
FIG. 7 shows six segments during assembly into a section of a conductor lane.

Because of the reduced conductor height at the recesses, all three partial pieces put together result in a sector of a winding layer with a constant height. Besides the supply segment 43 and the derivation segment 44 which are shown in FIG. 7 on the bottom right in a special embodiment, each conductor lane consists, independently of its length and its position in the winding layer, of only two different segment structures 41 and 42 which, in turn, have been assembled from four different stamped pieces 41a and 41b, resp. 42a and 42b. The four segments 41 and 42 depicted in a series from bottom left to top right are placed in this sequence into an appropriate mold and subsequently heated under pressure till they fuse into a one-piece conductor lane.

Another embodiment of the invention represents double winding layers which allow for an even and 100% utilization of the winding overhang space.

Figure 8:
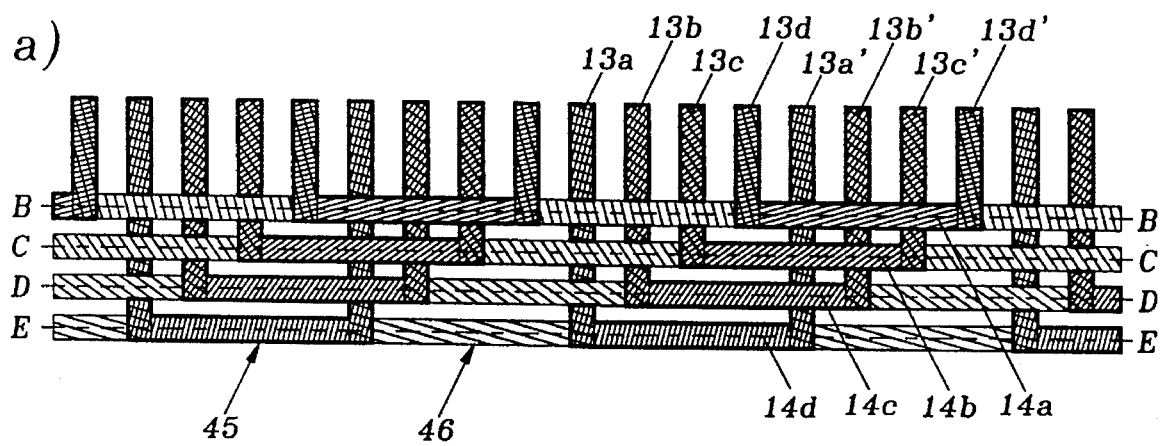
FIG. 8 shows the diagram of the conductor lanes and cuts through the links of a double winding layer of a 4-phase winding of a linear motor.
Figure 8:
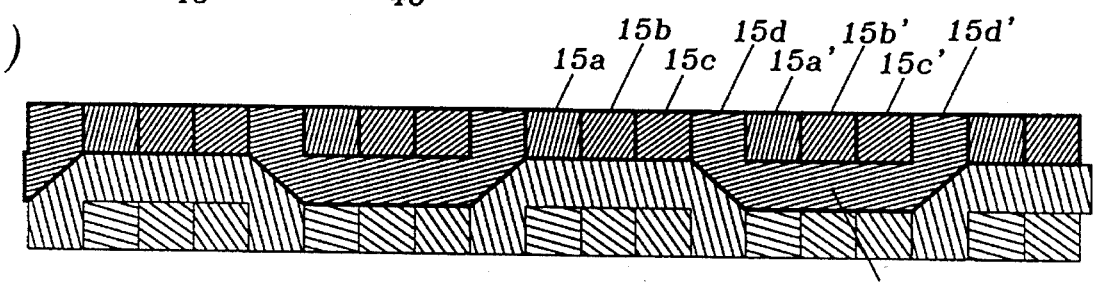
Figure 8:
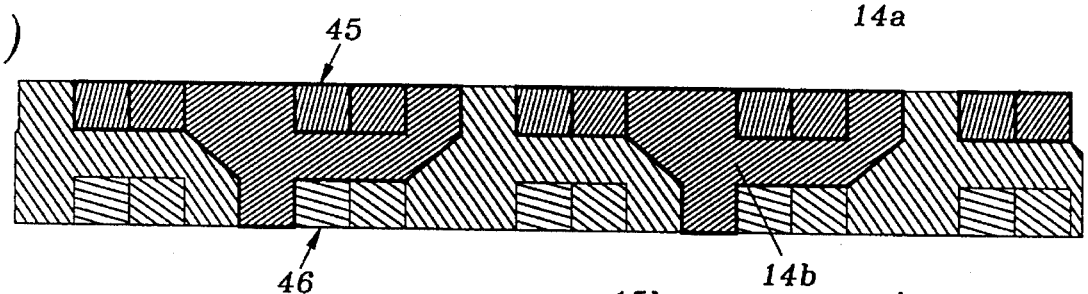
Figure 8:
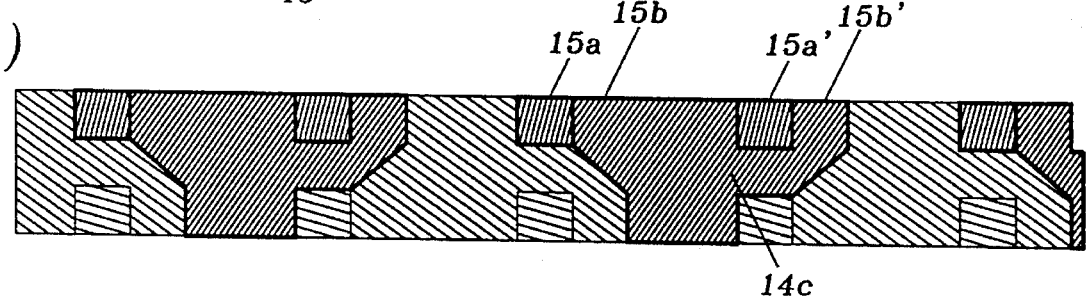
Figure 8:
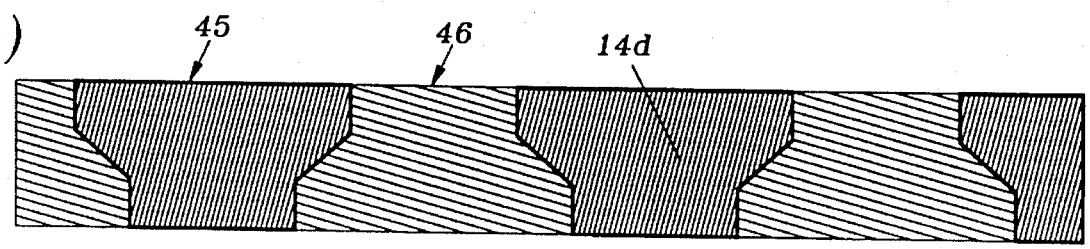

FIG. 8a) shows a section of the conductor diagram in a double winding layer for a 4-phase linear motor in which the section comprises four pole pitches in a winding overhang. In the drawing of the fictitious cut the positions of all conductor lanes of the two complementing layers are shown, but for illustrative purposes the widening of the bar connection sections has been eliminated and a distance is shown between the links which, in reality, should not exist. The conductors in the upper layer 45 are more densely hatched and, as in FIG. 3, separated into bars 13a–13d, bar connection sections 15a–15d, and links 14a–14d which are indicated by hatching lines that run from bottom left to top right. The hatching lines of the conductor positions in the lower layer 46 are rotated 90° and, therefore, run from top left to bottom right. FIG. 8a) further clarifies where the cuts B—B, C—C, D—D, and E—E are located that are shown in FIG. 8b, 8c, 8d, and 8e. These drawings of the cuts represent the real lateral view of all link layers in a winding overhang of a 4-phase double winding layer. The hatching types correspond to those used in FIG. 8a. The height of the links corresponds in part, particularly in the outer winding overhang areas, to the double conductor height in the grooves, however, the two layers remain identically shaped.

What I claim is:

1. Polyphase electric machine with prefabricated winding layers comprising a soft magnetic body with grooves, said grooves having a length, a width and a depth, said machine further having a plane surface parallel to a planar gap, parallel to the plane surface and within said grooves are arranged the winding layers, at least one of said winding layers consisting of at least two conductor lanes of different phases, each of said conductor lanes having a cross section, wherein the conductor cross sections vary on both sides outside the soft magnetic body, and wherein said polyphase electric machine further having a conductor lane of a winding layer, said conductor lane having in partial sections arranged outside the soft magnetic body a smaller cross section parallel to the groove depth than in sections lying inside the soft magnetic body.

2. Polyphase electric machine with prefabricated winding layers as recited in claim 1 comprising a conductor lane of a winding layer, said conductor lane having partial sections, said partial sections parallel to the groove length, by lying outside the soft magnetic body, and having decreased cross sections in direction to the groove depth, the decrease of said cross sections creating a space in which links of other conductor lanes of the same winding layer are arranged.

3. Polyphase electric machine with prefabricated winding layers comprising a soft magnetic body with grooves, said grooves having a length, a width and a depth, said machine further having a plane surface parallel to a planar gap, parallel to the plane surface and within said grooves are arranged the winding layers, at least one of said winding layers consisting of at least two conductor lanes of different phases, each of said conductor lanes having a cross section, wherein the conductor cross sections vary on both sides outside the soft magnetic body, and wherein said polyphase electric machine further having a conductor lane of a winding layer, said conductor lane having partial sections parallel to the groove length, but lying outside the soft magnetic body, said partial sections being enlarged in relation to the partial sections which are lying in the soft magnetic body.

4. Polyphase electric machine with prefabricated winding layers as recited in claim 1, in which conductor lanes of different winding layers are stacked on top of each other in a groove in direction to the groove depth, comprising
   a winding layer in which partial sections of conductor lanes are parallel to the groove width, said partial sections of conductor lanes of different phases being arranged parallel to the groove length behind each other and having the same distance to the plane surface.

5. Polyphase electric machine with prefabricated winding layers as recited in claim 1, comprising
   bar connection sections, a sum of said bar connection sections which are connected with a respective bar, being equal for all conductor lanes of a winding layer.

6. Polyphase electric machine with prefabricated winding layers as recited in claim 1, comprising
   a winding layer having conductor lanes with partial sections parallel to the groove width, said partial sections showing on both sides outside the soft magnetic body an equal distance to the soft magnetic body.

7. Polyphase electric machine with prefabricated winding layers as recited in claim 2, comprising slots provided on said machine through which portions of said soft magnetic body protrude, the conductor lanes being stacked on top of each other in direction to the groove depth in the soft magnetic body and being set off by one pole pitch in relation to each other, each conductor lane being comprised of bars which extend between said slots, and links which connect respective bars, a height of the links parallel to the groove depth corresponding in said partial sections of the links to double the height of the bars.

8. Polyphase electric machine with prefabricated winding layers as recited in claim 1, said electric machine being designed as a permanent excited disk armature, comprising a rotor disk being directly connected with a wheel rim by a pinion, said pinion transmitting a force without play to the wheel rim.

9. Polyphase electric machine with prefabricated winding layers as recited in claim 1, comprising a flat cooling element being arranged between two winding layers and being cooled by a coolant which circulates through said cooling element.

10. A winding layer for use in a polyphase electric machine, the winding layer having two oppositely facing generally flat surfaces that are parallel to one another and a distance between said surfaces taken in a direction normal to said surfaces defines a depth, the winding layer comprising at least two conductor lanes of different phases wherein each conductor lane having portions of which that vary in cross section in a direction parallel to the depth of the winding layer, wherein portions of respective conductor lanes overlap, and wherein the portions of the conductor lanes that overlap have a decreased cross section parallel to the depth of the winding layer.

11. The winding layer of claim 10 wherein the conducting lanes are sized and configured so as to be generally annular and further to have a plurality of circumferentially spaced slots, in which a soft magnetic body of the electric machine may be disposed through each slot.

12. The winding layer of claim 11 wherein a portion of only one conducting lane is disposed respectively between two adjacent slots, each conducting lane portion laying between said slots having a selected width generally equal to a distance between said adjacent slots.

13. The winding layer of claim 12 wherein each said lane further having sections extending arcuately around and outside of said slots, wherein said arcuate conducting lane portions having a decreased cross section in the direction of the depth of the winding layer creating a space in which portions of at least one other conducting lane which extends arcuately around and outside of said slots are disposed.

14. The winding layer of claim 12 wherein each said lane further having sections extending arcuately around and outside of said slots, wherein at least one of said arcuately extending portions having a width in a direction parallel to said winding layer surfaces that is greater than the width of the portions of the conducting lanes lying between adjacent slots.

15. The winding layer of claim 12 wherein at least two conducting lanes have portions which extend arcuately and outside of said slots, and wherein the arcuately extending portions of said lanes are adjacent to one another in a radial direction.

\* \* \* \* \*